[51.]

James B. Morgan.
Impd. Dust Pan.

119,042.  Patented Sep. 19, 1871.

Witnesses:  Inventor:
H. Lansing Perrine.  Jas. B. Morgan,
Lemuel Beasley.

UNITED STATES PATENT OFFICE.

JAMES B. MORGAN, OF DAVENPORT, IOWA.

IMPROVEMENT IN DUST-PANS.

Specification forming part of Letters Patent No. 119,042, dated September 19, 1871.

*To all whom it may concern:*

Be it known that I, JAMES B. MORGAN, of Davenport, Iowa, have invented new and useful Improvements in Dust-Pans; and I do hereby declare that the following is a full, clear, and exact description thereof, reference being had to the accompanying drawing and the letters of reference thereon, making part of this specification.

Figure 1:
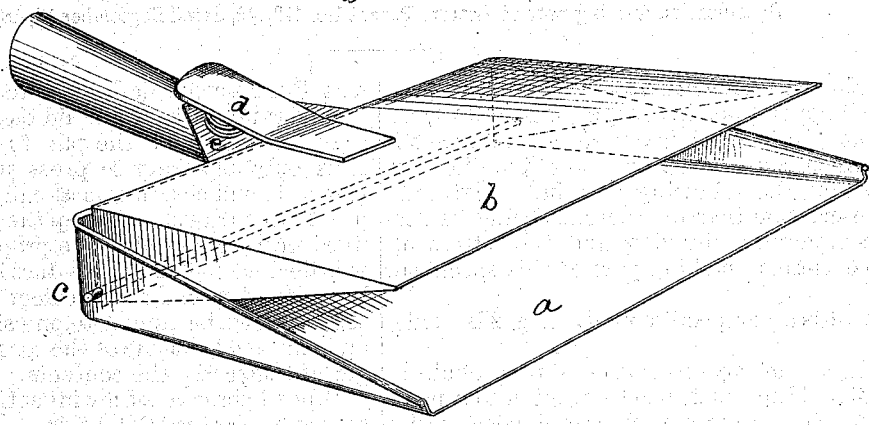
Figure 2:
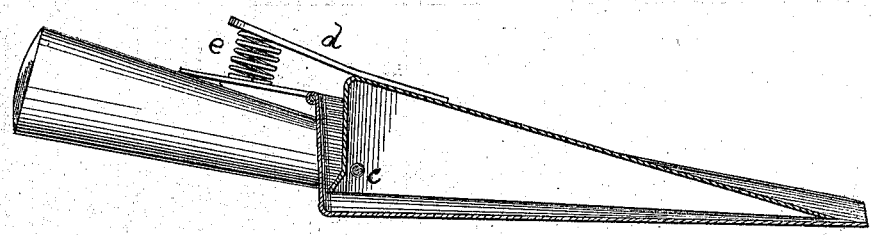

Figure 1 is a perspective view. Fig. 2 is a side view.

The object of my invention is to provide a means of holding dust, when swept into a pan, until conveyed to a proper place of deposit, without danger of being scattered over the carpet or floor.

It consists of an ordinary dust-pan, *a*, with a smaller one, *b*, inverted upon it and inside of it so as to form a lid, the two working together upon a hinge, *c*, made by a stout wire passing through both in such a manner as to hold the upper one in place. The upper pan or lid is provided with a thumb-piece or handle, *d*. A conical-shaped spiral spring, *e*, is adjusted between this thumb-piece and the handle of the lower pan, serving to keep the lid closed.

In order to open the pan to receive the dust it is only necessary to press upon the thumb-piece. It will close automatically when the pressure is withdrawn, and keep the dust closely confined until conveyed to the proper place. When it is desired to deposit the dust in a place having but a small opening, as the door of a small stove, the pan may be tipped to one side while closed, and emptied from one of the corners without danger of scattering the contents.

What I claim as of my invention, and desire to secure by Letters Patent, is—

The construction of a dust-pan with a lid, having a thumb-piece and spiral spring, substantially as described, and for the purposes set forth.

In testimony that I claim the above I have hereunto subscribed my name in presence of two witnesses.

JAMES B. MORGAN.

Witnesses:
J. P. DOSH,
H. A. H. PLAYTER.